United States Patent [19]

Clewett

[11] Patent Number: 5,857,533
[45] Date of Patent: Jan. 12, 1999

[54] VEHICLE CARRIED AND DRIVEN BY ARTICULATED LEGS

[75] Inventor: John Clewett, Alvsjo, Sweden

[73] Assignee: Älvsjö Data AB, Sweden

[21] Appl. No.: 732,367

[22] PCT Filed: Apr. 28, 1995

[86] PCT No.: PCT/SE95/00478

§ 371 Date: Oct. 28, 1996

§ 102(e) Date: Oct. 28, 1996

[87] PCT Pub. No.: WO95/29836

PCT Pub. Date: Nov. 9, 1995

[30]  Foreign Application Priority Data

Apr. 29, 1994 [SE] Sweden ................ 9401504.7

[51] Int. Cl.[6] ............................................. B62D 57/02
[52] U.S. Cl. ............................................. 180/8.1
[58] Field of Search ...................... 180/8.1, 8.2, 8.3, 180/8.4, 8.5, 8.6; 901/1

[56]  References Cited

U.S. PATENT DOCUMENTS

| | | |
|---|---|---|
| 4,503,924 | 3/1985 | Bartholet et al. . |
| 4,558,758 | 12/1985 | Littman et al. . |
| 4,565,487 | 1/1986 | Kroczynski . |
| 4,738,583 | 4/1988 | Macconochie et al. ............ 180/8.6 |
| 5,040,626 | 8/1991 | Paynter . |
| 5,121,805 | 6/1992 | Collie . |
| 5,353,886 | 10/1994 | Paakkunainen .................. 180/8.1 |

FOREIGN PATENT DOCUMENTS

| | | |
|---|---|---|
| 74286 | 3/1983 | European Pat. Off. . |
| 389243 | 9/1990 | European Pat. Off. . |
| 401120 | 12/1990 | European Pat. Off. . |
| 85-092173 | 5/1985 | Japan . |

*Primary Examiner*—Kevin Hurley
*Attorney, Agent, or Firm*—Quarles & Brady

[57]  ABSTRACT

The invention relates to a device at a vehicle (8) supported and driven by articulated legs (10), the legs (10) comprising a number of leg-segments (1 . . . 7) which are moveably connected to the chassis (9) of the vehicle and to each other by means of joints (11 . . . 17). The two joints located closest to the vehicle are moveable relative to each other about axes, which are perpendicular to each other.

8 Claims, 3 Drawing Sheets

VEHICLE CARRIED AND DRIVEN BY ARTICULATED LEGS

The present invention concerns a vehicle supported and driven by articulated legs, according to the preamble of claim 1. Such vehicles are previously known, designed so that they can, as opposed to normal vehicles with wheels, move in very uneven and/or rough terrain.

In the prior art, there are several examples of leg-supported vehicles designed to move in uneven terrain or to perform various operating tasks in such terrain. Such a vehicle is disclosed in U.S. Pat. No. 4,555,758. This vehicle has a central body or chassis, provided with four articulated legs. Each leg is connected to the chassis by a joint disposed at the chassis and having a substantially vertical pivot axis. A first leg-segment is pivotable at this first pivot axis and is connected at one end to this vertical, first pivot joint. At the other end of the first leg-segment, there is a joint having an axis located substantially in a horizontal plane and being directed, in its neutural position, substantially in the direction of movement (forwards or backwards) of the vehicle. Counting from the chassis, externally of the second pivot axis, there are still a number of leg-segments which are moveable relative to each other at pivot joints being parallel to the second pivot joint. The outermost leg-segment is provided, at its outer end, with a drive-wheel and an associated power source. Thus, in this known embodiment, all of the other leg-segments, outside the first, vertical pivot joint, move in the same vertical plane about horizontal axes. The angle of the vertical plane relative to the longitudinal direction of the vehicle, which substantially concides with the direction of movement of the vehicle, is determined by the pivot angle at the first joint. The movement of each leg-segment is accomplished by a power device, disposed between the leg-segment and the adjacent leg-segment located closer to the chassis. The device according to U.S. Pat. No. 4,558,758 is also provided with telescopic leg-segments. The movement of the device is achieved through adjustment of the wheels in the direction of movement.

The patent U.S. Pat. No. 4,503,924 discloses a leg-mechanism operating in principle as a pantograph mechanism, in order to move the support point at the outer end of the outer-most leg-segment in a horizontal direction. The movements of the leg are achieved by motors which drive worm-gears, along which threaded nuts connected to the leg-segments are moveable.

Both of the devices discussed above have several disadvantages. Thus, the legs described in U.S. Pat. No. 4,558,758 are very heavy and long, which means that the legs are unable to carry out quick movements because of the great angular momentum during pivotal movements about the joints In principle, the legs have two degrees of freedom or movement parameters, i.e. a first degree of freedom represented by the pivotal movement about the substantially vertical pivot axis at the chassis, and a second degree of movement represented by the pivotal movement about a number of mutually parallel axes, being perpendicular to the first pivot axis. The speed of movement of the legs is therefore limited, first because of the great momentum forces and secondly because the legs only have two degrees of freedom.

The device according to U.S. Pat. No. 4,503,924 has a relatively light structure with small momentum forces during the movement. The movements are, however, very slow in spite of the small momentum forces.

The object of the present invention is to substantially reduce or eliminate the drawbacks found at prior art devices and to provide light and quickly moveable legs for accomplishing a vehicle, which can be moved over uneven and/or rough terrain at high speed.

In a vehicle supported and driven by articulated legs, being constructed of several segments being moveably connected to the chassis of the vehicle and to each other by means of joints, the object of the invention is achieved in that the free joints located closest to the vehicle are moveable relative to each other about axes, which are perpendicular to each other.

In particular, the object is achieved in that the joints located closest to the vehicle are so constructed that the first joint for movement between the chassis and the first leg-segment has a first, substantially vertical pivot axis, in that the second joint for movement between the first leg-segment and the second leg-segment has a second, substantially horizontal axis of rotation extenting along the longitudinal axis of the second leg-segment and perpendicularly to the first pivot axis, and in that the third joint for movement between the second leg-segment and the third leg-segment has a third pivot axis being perpendicular to the second axis of rotation.

According to the invention, several other advantages are obtained, as appears from the dependent claims. The invention will be described further below with reference to the appended drawings where FIG. 1 shows a view from the front of the vehicle according to the invention;

Figure 1:
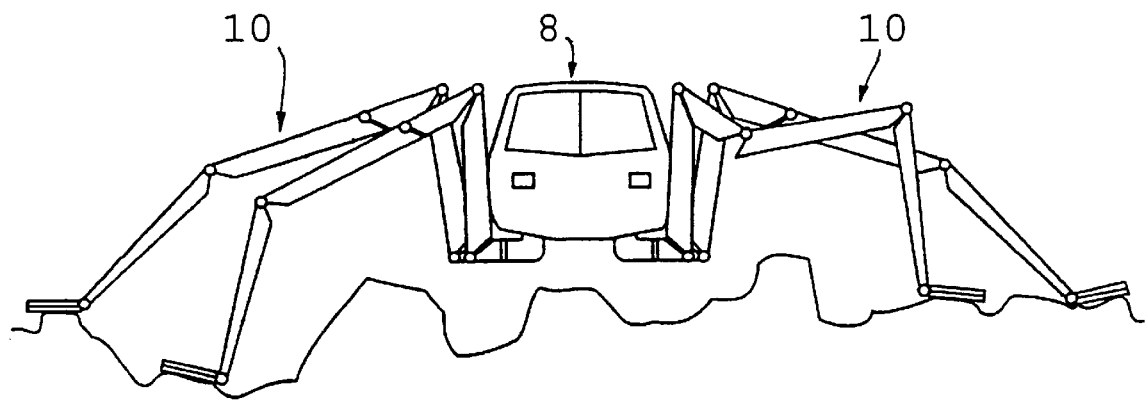

In FIG. 1, numeral 8 represents the vehicle in its entirety, numeral 9 represents the chassis of the vehicle, and numeral 10 represents the legs mounted on both sides of the vehicle.

Figure 2:
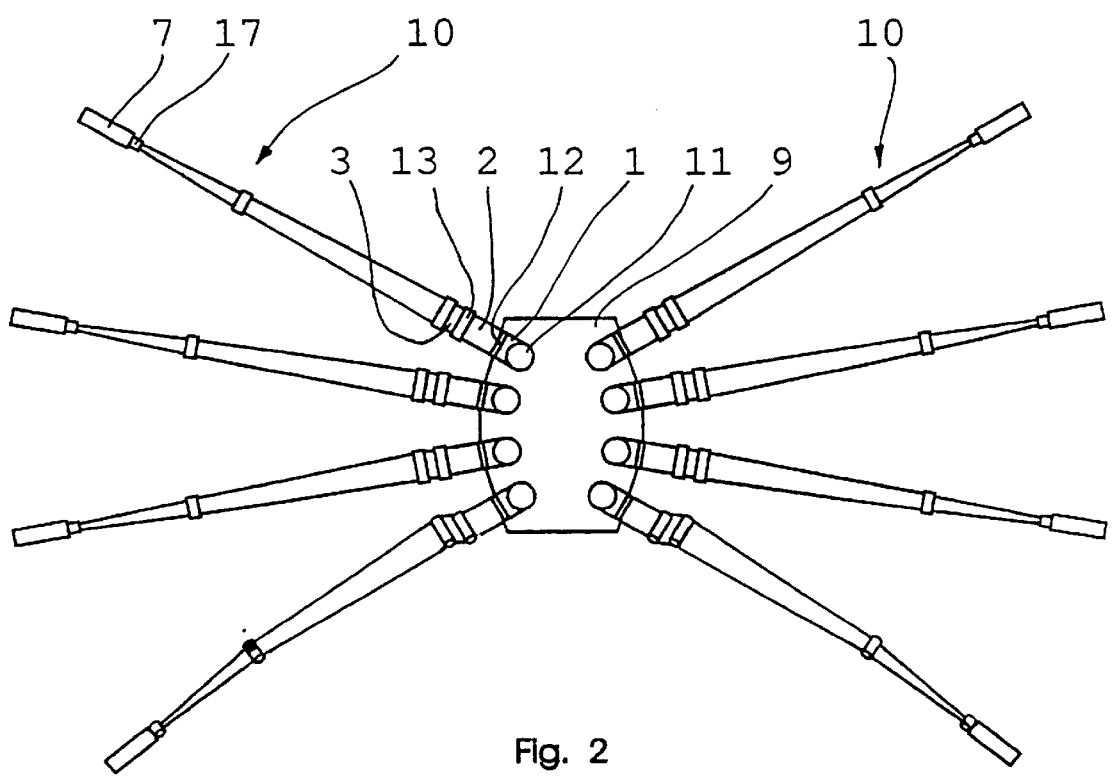
FIG. 2 shows a view from the underside of the vehicle in FIG. 1.

FIG. 2 also shows the chassis 9 and the legs 10 mounted on each side, the number of legs being totally eight in the shown embodiment. Numeral 11 represents the first joint between the chassi 9 and the first leg-segment 1, numeral 12 represents the second joint between the leg-segments 1 and 2, and numeral 13 represents the joint between the leg-segment 2 and 3, whereas numeral 17 represents the outermost joint at which the leg-segment 7 is rotatable. The joint and the segments will be shown and described in detail with reference to the other drawing figures.

Figure 3:
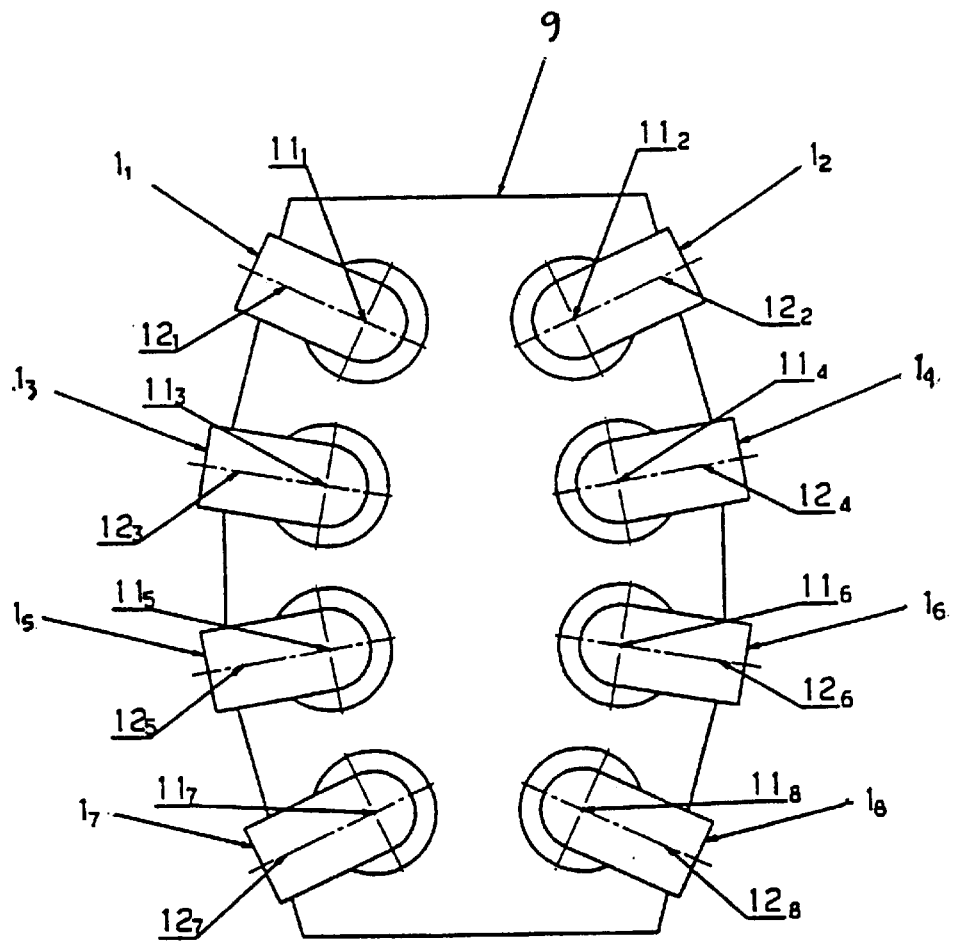
FIG. 3 shows a portion of the device in FIG. 2, i.e. the underside of the chassis and the leg attachments thereof.

FIG. 3 shows the under-side of the chassis 9 and the four substantially vertical rotational axes $11_1$–$11_2$, $11_3$–$11_4$, $11_5$–$11_6$ and $11_7$–$11_8$ disposed in four pairs. The first leg-segments pivot about the rotational axes and are also arranged in pairs, $1_1$–$1_2$, $1_3$–$1_4$, $1_5$–$1_6$ and $1_7$–$1_8$. The first leg-segments $1_1 \ldots 1_8$ support rotational axes $12_1 \ldots 12_8$ located generally in a horizontal plane, being connected to the first leg-segments $1_1 \ldots 1_8$ at right angle to the substantially vertical pivot axes $11_1 \ldots 11_8$ for a rotational movement between each segment $1_1 \ldots 1_8$ and the respective outside leg-segment (not shown here), represented in a corresponding way by $2_1 \ldots 2_8$.

Figure 4:
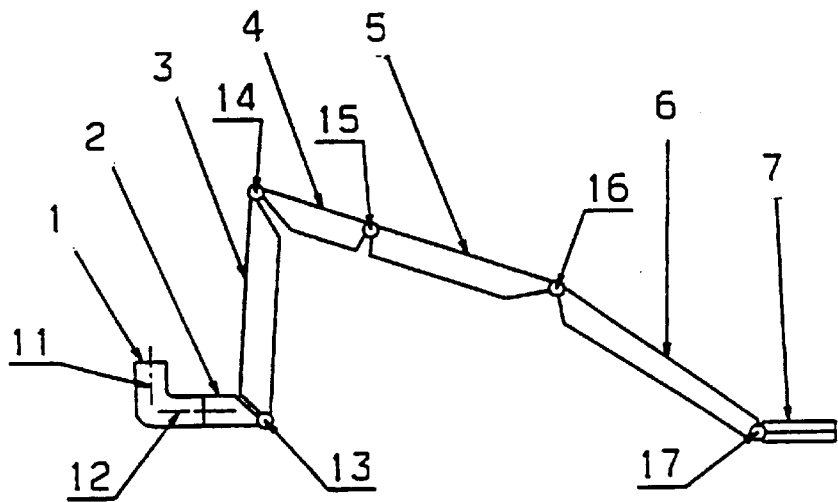
FIG. 4 shows a leg with leg-segments and joints seen from the front.

FIG. 4 shows a leg 10, where the first leg-segment 1 pivots about the substantially vertical axis 11 and where the second leg-segment 2 is rotated relative to the leg-segment 1 about the rotational axis 12 located generally in the horizontal plane. At the outer end of the leg-segment 2 there is a pivot joint 13 about which the third leg-segment 3 is pivotable. Outside the leg-segment 3 there are further leg-segments represented by 4, 5, 6 and 7, between which there are pivot joints 14, 15, 16 and 17 having pivot axes being parallel to the pivot axis 13. Consequently, the leg-segments 2–7 are all located in the same plane while pivoting at the joints 13–17. The orientation of this pivot plane is substantially determined by a rotational movement about the axis 11, in case of an adjustment of the angle relative to the travelling movement, i.e. the longitudinal direction of the chassis 9, whereas the inclination of the plane forwards or backwards is generally determined by the rotation about the rotational axis 12. This will be apparent from FIG. 5.

Figure 5:
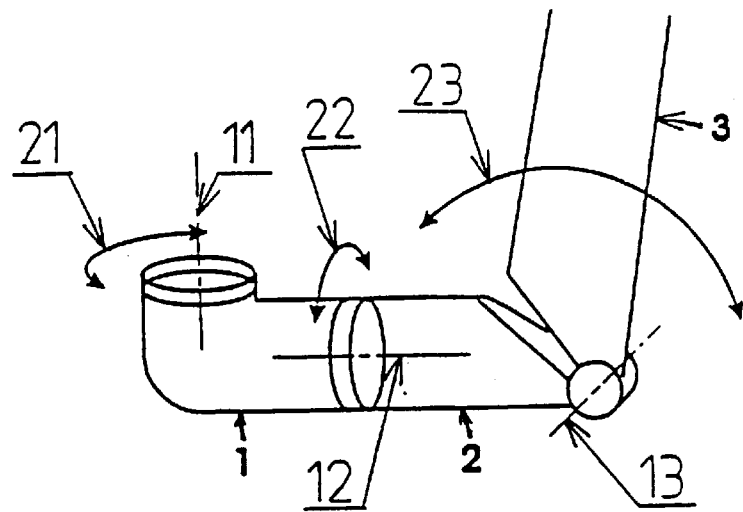
FIG. 5 is a detailed view of the three innermost joints shown in FIG. 4.

In FIG. 5, numeral 21 represents the pivot angle about the axis 11 between the chassis 9 and the first leg-segment 1, numeral 22 represents the rotational angle between the leg-segments 1 and 2 about the axis 12, and numeral 23 represents the pivot angle between the leg-segments 2 och 3 about the axis 13. The pivot axis 11 is vertical, when the chassi 9 of the vehicle is horizontally oriented, and follows the movements of the chassis, so it is obvious that this relates to the orientation of the vehicle. One of the aims of the vehicle is that during driving this axis should be substantially vertical. The rotational axis 12 is perpendicular to the pivot axis 11 and extends in the longitudinal direction of the leg-segment 2. Pivotal movements 21 about the pivot axis 11 will thus determine the direction of the rotational axis 12 forwards or backwards, whereas a rotation about the rotational axis 12 will generate a rotational angle 22 determining the inclination of the plane, where the leg-segments 2 and 3 pivot about the pivot axis 13 being perpendicular to said plane. The pivot angle between the leg-segments 2 and 3 is represented by numeral 23.

Figure 6:
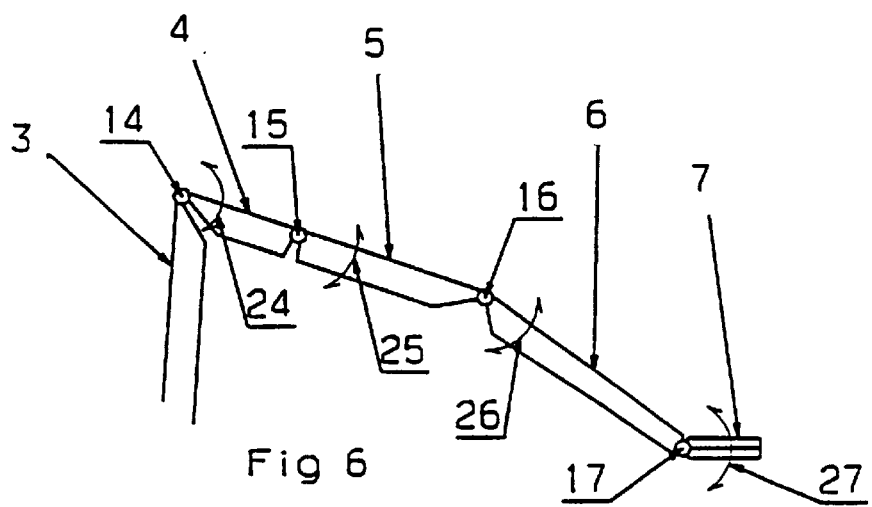
FIG. 6 is a view of the outermost leg-segments.

FIG. 6 shows the leg-segments 3, 4, 5, 6 and 7 and the pivot joints 14, 15, 16 and 17 disposed therebetween. Numeral 24 represents the pivot angle between the leg-segments 3 and 4 about the joint 14, numeral 25 represents the pivot angle between the leg-segments 4 and 5 about the joint 15, numeral 26 represents the pivot angle between the leg-segments 5 and 6 at the joint 16, and numeral 27, finally, represents the pivot angle between the segments 6 and 7 at the joint 17. All pivot joints 14, 15, 16 and 17 are mutually parallel and also parallel to the pivot joint 13, though perpendicular to the rotational axis 12 which in turn is perpendicular to the pivot axis 11.

Figure 7:
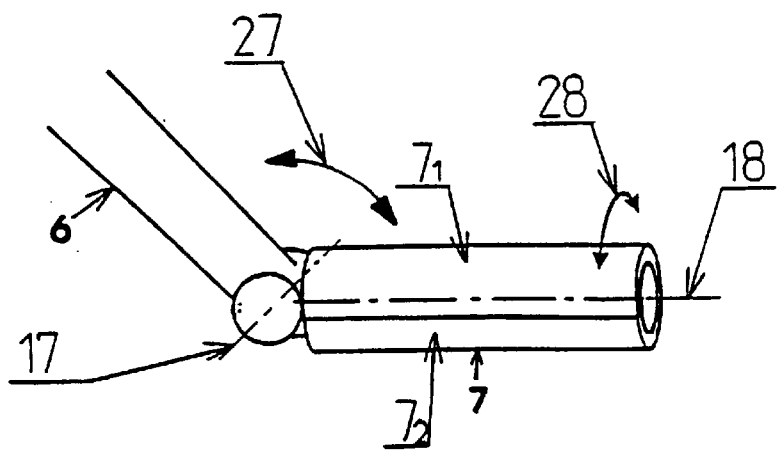
FIG. 7 shows the outermost, supporting leg-segment.

FIG. 7 shows in detail the structure of the outermost, cylindrical leg-segment 7. The latter is pivotable about the above mentioned pivot axis 17 relative to the leg-segment 6 located at the inside adjacent thereto. The outermost leg-segment 7 rests on the supporting surface and is in this embodiment constituted by a cylindrical body, which is rotatable about a rotational axis 18 at an angle 28. The cylinder has two different surface structures, where the structure $7_1$ in the shown position is facing upwards, and the structure $7_2$ is facing downwards and rests on the supporting surface. By rotation about the axis 18 it is possible to select the surface structure which is most suitable to the supporting surface.

The mechanical structure according to the invention has been described above. The structure corresponds in principle to the structure of a fast moving spider. The size of the invented vehicle can fall into three general classes. In a first embodiment, the vehicle is small and radio-controlled, in a medium-class embodiment the vehicle is designed for a crew of one to two persons and be controlled by these persons or be designed for the transport of material with one driver or being radio-controlled, and in a third embodiment the vehicle is very large for the transport of up to 25 persons or the corresponding amount of material, also controlled by one of the persons or being radio-controlled.

Preferably, the vehicle has eight legs with seven segments each, these segments being made of light-weight, very strong metal or a carbon-fibre material, or a combination of both. The segments are hollow to enable mounting of necessary motors, gears, pistons, cables, sensors or other components. The sixth segment in each leg includes a sensor and locking mechanism which provides the feed-back necessary to fix the position of the leg during the drive-phase. Each leg ends with a segment which can be rotated for the selection of different support surfaces. The body of the vehicle is preferably made of carbon-fibre material, possibly being reinforced for special purposes.

As a power-sorce, it is possible to use a battery or a turbine-electric power source depending on the size of the vehicle and the environment in which the vehicle will operate. The movements can be achieved by a combination of hydraulic motors, gas-driven cylinders and electric motors.

The control system is computer-controlled with the use of several simple computers working together. Preferably, the movements of the legs are programmed so as to correspond to a fast-moving ground spider. This is achieved by creating a base computer-program in order to control the power sources by means of the operator's control stick. Alternatively, the controlling program could receive its input from another computer program based on a special mission, such us "search for . . . ", "track object 'X' forwards or backwards" or other missions. Visual systems using various combinations of visible light, infra-red light, ultra short wave lengths and chemical sensors can also be coupled to the control system in order to ensure a coordination of the movements e.g., in narrow areas where the operator (or the program) is only interested in arriving at point A from B, and not how to coordinate the necessary movements in order to arrive there.

The speed of the vehicle is determined by the stroke rate of the legs (the movement rate in the direction forwards and backwards) and by the stroke length (the distance between the outer end of each leg and the chassis when contacting the ground). For example, when starting, the outer joints of the legs are normally situated close to the chassis 9 of the vehicle. The speed can thereafter be controlled either by increasing the number of strokes or the length of each stroke, or by a combination of these parameters. When braking, the stroke rate is increased, while the stroke length is reduced until the vehicle has stopped.

Strain-gauge sensors or other sensors can be arranged on each leg in order to sense the pressure of each leg on the ground, so that breakage of a leg is avoided.

The above disclosure is related to a specific embodiment. To those skilled in the art, it is obvious that the invention can be attained in other ways within the scope defined by the claims. For example, it is possible to couple vehicles of this kind in series one after the other, wherein each vehicle may have a specific design for a particular operating task. It is also possible to provide the vehicles with gripping arms or with arms having different tools or equipement to achieve various tasks. It is also evident that one or more vehicles may move at will in different directions forwards, backwards or sideways, or to turn right or left in response to a particular computer program.

Moreover, it is apparent that the invention can be applied to vehicles with more or less legs than those shown in the example with eight legs. Thus, it is possible to reduce the number of legs to four with at least one leg at one side of the vehicle, still allowing the vehicle to move stably, although with a considerable reduction in speed. It is also possible to incorporate stabilization-gyros, course-gyros or compass-instruments into the control system of the invented device.

I claim:

1. A vehicle (8) having a chassis (9) which is supported and driven by at least four articulated legs (10) arranged in pairs, said legs (10) comprising a number of leg-segments (1 ... 7), which are moveably connected to said chassis (9) and to each other by means of joints (11 ... 17), characterized in that each of said legs (10) has at least three joints located closest to the vehicle, these joints allowing movements about axes being successively, as seen from the vehicle, perpendicular to each other, the first joint (11) for movement (21) between the chassis (9) and the first leg-segment (1) has a first, substantially vertical pivot axis (11), the second joint (12) for movement (22) between the first leg-segment (1) and the second leg-segment (2) has a second, substantially horizontal rotational axis (12) extending along the longitudinal axis of the second leg-segment (2) and being perpendicular to the first pivot axis (11), and the third joint (13) for movement (23) between the second leg-segment (2) and the third leg-segment (3) has a third pivot axis (13) being perpendicular to the second rotational axis (12).

2. A vehicle as defined in claim 1, wherein leg-segments (3 ... 7) located outside the third joint (13) are moveably connected to each other by means of pivot joints having pivot axes (14 ... 17) being parallel to the third pivot axis (13).

3. A vehicle as defined in claim 1, wherein the outermost leg-segment (7) comprises a support member for contacting the ground, said support member being adjustable for adaption to the irregularity of the supporting ground by pivoting (27) about a pivot joint (17) disposed at the inner end of the leg-segment.

4. A vehicle as defined in claim 3, wherein the support member is constituted by a support body, which is rotatable about a rotational axis (18) extending in the longitudinal direction of the leg-segment (7) and perpendicularly to the outermost pivot axis (17).

5. A vehicle as defined in claim 1, further comprising a support body which has support surfaces with different structures or coatings ($7_1$–$7_2$) adapted to the supporting ground.

6. A vehicle as defined in claim 1, wherein the vehicle (8) includes at least eight legs (10) being arranged in pairs.

7. A vehicle as defined in claim 6 wherein hydraulic motors generate the movements (21,22,23,24,25,26,27) between the chassis and the leg-segments of said legs.

8. A vehicle as defined in claim 7, wherein the hydraulic motors are computer controlled and programmed to coordinate the movements of the legs.

* * * * *